Aug. 15, 1950 E. W. LAISNÉ 2,518,796
OPHTHALMIC LENS PROTRACTOR
Filed May 24, 1945 2 Sheets-Sheet 1

INVENTOR.
E. W. Laisné

Aug. 15, 1950     E. W. LAISNÉ     2,518,796
OPHTHALMIC LENS PROTRACTOR
Filed May 24, 1945     2 Sheets-Sheet 2
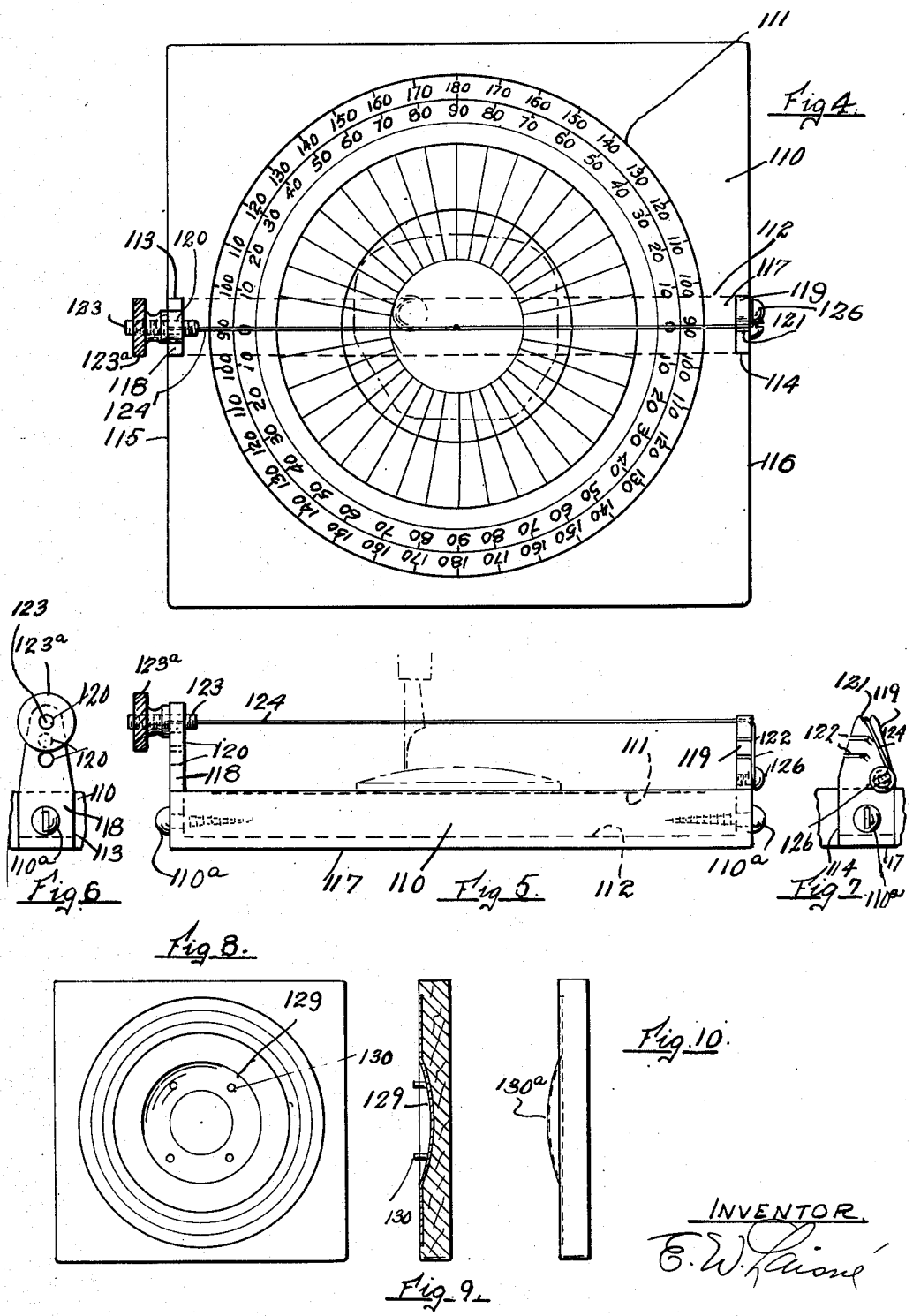
INVENTOR
E. W. Laisné

Patented Aug. 15, 1950

2,518,796

UNITED STATES PATENT OFFICE 2,518,796

OPHTHALMIC LENS PROTRACTOR

Eugene W. Laisné, Fresno, Calif.

Application May 24, 1945, Serial No. 595,528

1 Claim. (Cl. 33—174)

My invention relates primarily to an ophthalmic lens protractor used in the final processing of eyeglass and other lenses.

In cutting and grinding of eyeglass lenses to a given prescription it is necessary that certain temporary indices or guide lines be laid out or inscribed upon the rough or semi finished lenses as a guide for the mechanic who is to do the work.

Cylindric lenses have two principal meridians of power and these meridians are at right angles to each other. One of these meridians produces the greatest power and the other the least power of the lens.

In a cylindric curve the angle or slant of the plane of the surface is expressed in degrees. The degree numbers indicate the position of the plane of the cylinder as compared to the horizontal line of the lens as set in the frame or mounting. This plane meridian is called the axis and the angle of the plane to the horizontal is determined with the aid of a protractor.

This instrument is usually a circle crossed with numerous degree lines radiating from the center to the outer edge and numbered at their outer ends to indicate the angle formed with the horizontal or zero line.

The position of the plane of the cylinder must be considered in the laying out for spherical or cylindrical second side grinding with the plane of the cylinder on the line of the protractor corresponding to the degree number or angle given as the axial meridian and a line drawn on the lens identical with the horizontal or zero line of the protractor. This line will be the "cutting line" or the long diameter of the lens in the shape it is to be worn.

Heretofore the laying out or inscribing of these necessary lines has been performed "free hand" by laying the lens upon the protractor face and attempting to inscribe a line upon the lens with a pen and ink in exact register with the desired line upon the protractor. It is obvious that this procedure must of necessity be slow and more or less inaccurate resulting in improper filling of the given prescription, which in turn necessitates regrinding or replacement of the faulty lenses thereby incurring added expense to the manufacturer and inconvenience to the customer.

It is the prime object of my invention to provide means for overcoming the above objections and to enable the operator to easily, quickly and accurately transcribe the desired indices or guide lines upon the lenses in exact register with the given lines of the protractor.

Another object is to provide a device of the above character which will be simple in construction and operation and cheap to manufacture.

Another object is to provide in a device of the above character means for easily and quickly adapting the same to varying thickness and types of lenses.

Other objects and advantages will appear hereinafter and, while I have shown and will describe the preferred form of my invention, it will be understood that I do not limit myself to such preferred form but that various changes and adaptations may be made therein without departing from the spirit of my invention.

In the drawings accompanying and forming a part hereof:

Fig. 4 is a top plan of another form of my device.

Fig. 5 is an edge view of Fig. 4.

Fig. 6 is a fragmentary view of the left hand edge of Fig. 5.

Fig. 7 is a fragmentary view of the right hand edge of Fig. 5.

Figs. 8, 9 and 10 are views showing other forms of my protractor.

Figure 1:
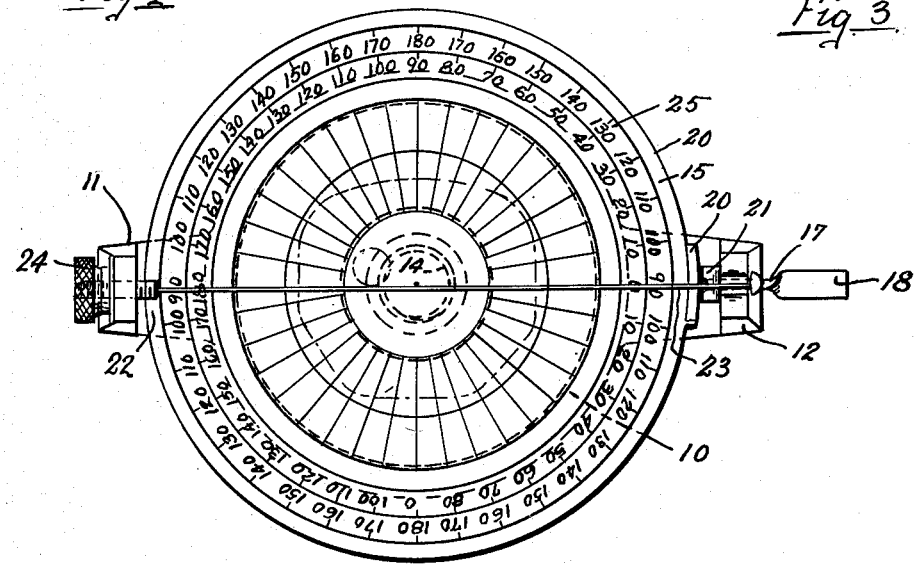
Fig. 1 is a top plan of a protractor constructed according to my invention.
Figure 2:
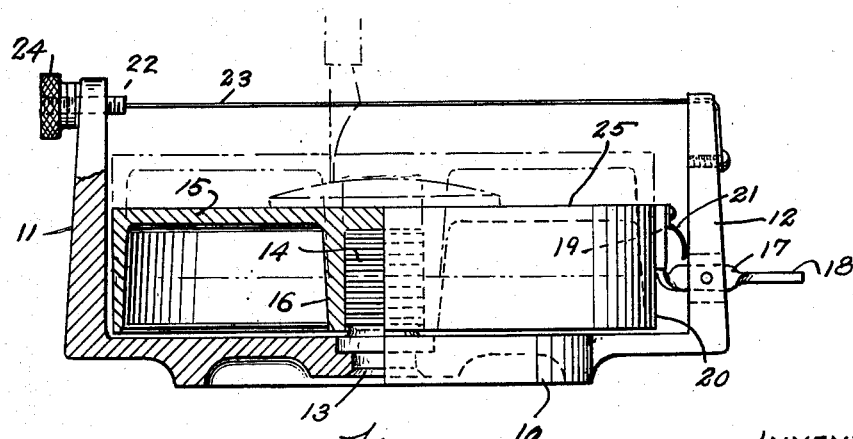
Fig. 2 is a bottom edge view of Fig. 1 partly in section.

Referring to the drawings (Figs. 1 and 2) 10 indicates an annular base or support adapted to be positioned upon a bench or table and having oppositely disposed radially extending L-shaped arms 11 and 12 projecting from the outer periphery thereof. Rigidly mounted at its lower end 13 in the base 10, centrally thereof, to extend upwardly therefrom, is a screwthreaded pintle bolt 14. A table 15 is mounted immediately above base 10, concentric therewith and is provided with a downwardly depending concentric hub 16, which is interiorly screwthreaded for operative engagement with the pintle bolt 14, by means of which said table is rotatably supported above said base and is also capable, thru the medium of the screwthreads, of being raised or lowered relatively thereto.

Pivotally mounted in one of the arms 12 is a lever 17 the outer end of which terminates in a finger piece 18 and secured upon the other or inner end thereof is a brake shoe 19 which is arranged to bear against the side wall 20 of the table 15, a spring 21 acting to normally hold said brake in its operative position to hold said table in any adjusted position against rotation. Slidably mounted in the upper end of the arm 11, to project from either side thereof, is a screwthreaded stud 22 to the inner end of which is permanently secured one end of a wire 23, preferably steel music wire altho any other suitable material may be used, the other end of which wire is secured to the upper end of the other arm 12. On the outer end of the stud 22 is provided a screwthreaded thumb nut 24 by means of which the tension of the wire 23 may be controlled.

Formed in the upper face of the table 15 is the protractor 25 which is usually a circle crossed with numerous degree lines radiating from the center to the outer edge and numbered at their outer ends to indicate the angle formed with the horizontal or zero line.

In the use of this form of my device the lens to be laid out will be positioned centrally of the protractor with its horizontal line coinciding with the horizontal or zero line thereof.

The brake is then disengaged and the table, (and with it the lens) is rotated until the degree line representing the plane of the cylinder coincides with the index wire 23 and the brake is permitted to again engage the table and lock the same in its adjusted position.

Using the index wire 23 as a guide a pen or other marking instrument is used to scribe a line on the face of the lens coinciding with the degree line of the protractor.

To change the relative vertical positions of the table and guide wire to compensate for various thicknesses of lens the table is rotated in the necessary direction to move the same up or down upon the screwthreads.

Figure 3:
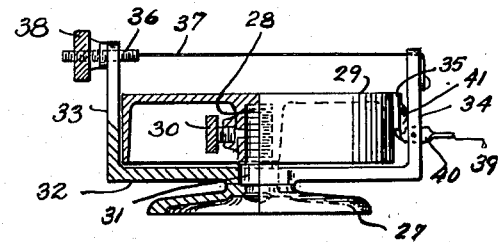
Fig. 3 is a side elevation of another form of my device partly in section.

In Fig. 3 I have shown another form of my device wherein the table and guide wire are adjustable independently of each other.

In this form I provide a base 27 from which extends upwardly centrally thereof a screwthreaded pintle bolt 28, upon which is screwthreadedly mounted the protractor table 29 so as to be adjustable vertically, a set screw 30 being provided for locking said pintle bolt and table against relative movement and lock said table in its adjusted position vertically.

Immediately below the table 29, pintle bolt 28 is enlarged to form a journal 31 upon which is rotatably mounted the index wire carrier 32. Member 32 is substantially U-shaped in side elevation, is mounted about centrally of its base upon the journal 31 and its legs 33 and 34 extend upwardly on opposite sides of table 29. A brake member 35 carried by the leg 34 provides means for securing table 29 and member 32 against accidental relative movement.

Projecting through the upper end of the leg 33 to extend beyond each side thereof is a screwthreaded stud 36 to the inner end of which is secured one end of the line wire 37. The outer end of wire 37 is detachably secured to the upper end of the other leg 34 in any suitable or preferred manner. A threaded thumb nut 38 on the outer end of stud 36 provides means for tensioning wire 37.

In the use of this form of my device, by loosening the screw 30 table 29 may be rotated around pintle bolt 28 and, thru the medium of the screwthreads, raised or lowered as desired and the set screw 30 again tightened when the table will be again locked against relative rotation. By depressing the finger piece 39 of the brake lever 40 brake 35 will be released from contact with table 29 and the index wire carrier 32 may be rotated upon journal 31 to bring the wire 37 into register with any of the lines upon the protractor table 29. Release of pressure upon the finger piece 39 will permit the spring 41 to force the brake 35 into contact with the table 29 and hold the same against movement relative to wire carrier 32.

In Figs. 4 to 7 inclusive, 110 indicates a rectangular block of wood, plastic, metal or any other desired material upon the upper face of which is permanently positioned the protractor 111 by means of screws or otherwise.

Formed in the underside of the block 110 on the longitudinal center thereof is a rectangular groove or channel 112 the ends of which register with the lower ends of similar vertically extending grooves 113 and 114 in the opposed edges 115 and 116 of block 110, and mounted within these grooves by means of screws 110a is a substantially U-shaped member 117 the upstanding legs 118 and 119 of which extend for a distance above the upper face of block 110. Provided in the upper end of the leg 118 of member 117 are a plurality of equally spaced holes 120 in vertical alinement.

Formed in the upper end of the leg 119 of member 117 is a notch 121 and immediately below this notch are provided a plurality of transverse slits 122 the inner termination of these slits coinciding vertically with the notch 121.

Slidably positioned within one of the holes 120 in leg 118, to project from each side thereof, is a screw threaded rod 123 on the outer end of which is positioned a screw threaded thumb nut 123a. Rigidly secured to the inner end of rod 123 centrally thereof is one end of a wire 124, preferably of steel music wire, altho any other suitable material may be used.

Wire 124 is positioned to extend between the legs 118 and 119 with its free end passing thru the notch 121 in leg 119 then downwardly along the outer side of said leg into engagement with the clamp screw 126 which holds the same securely against displacement.

It will be understood that the position of wire 124 relative to the "cutting" or horizontal line of the protractor will be sufficiently offset to compensate for the diameter of the pen holder so as to bring the pen point directly over said "cutting" or horizontal line when the device is in use.

The object of the multiple holes and slits in legs 118 and 119 is to permit of raising or lowering wire 124 to compensate for varying thickness and shapes of lenses. The thumb nut 123a and rod 123 are provided for adjusting the tension of wire 124.

In Figs. 8 and 9, I have shown another form of protractor adapted for use with my device. In this form I provide a central arcuate or concaved recess 129 of a size to easily accommodate the maximum size lens both as to depth and diameter and projecting upwardly from this recess are a plurality of spaced studs 130 the upper ends of which are adapted to support the lens to be laid out, these studs being of a height such as to correctly support lenses of varying depth or radius above the protractor.

In Fig. 10 is shown the protractor as being convexed instead of concaved.

The studs 130 may be omitted if desired or found advisable.

Having described my invention, what I claim is:

An ophthalmic protractor comprising a stationary base, an exteriorly screwthreaded stud immovably mounted at its lower end in said base to extend upwardly therefrom; a lens supporting table screwthreadedly mounted upon said stud concentric therewith whereby rotation of said table will raise or lower the same relative to said base; a protractor inscribed upon the upper face of said table; a pair of diametrically opposed, substantially L-shaped arms extending outwardly and upwardly from said base and terminating at a distance above said table; a brake member yieldably mounted upon one of said arms arranged to bear against the side wall of said table and prevent relative movement between said base and table; a guide wire extending between the upper ends of said arms across said table; and means for controlling the tension of said wire.

E. W. LAISNÉ.

REFERENCES CITED

The following references are of record in the file of this patent:

UNITED STATES PATENTS

| Number | Name | Date |
| --- | --- | --- |
| 89,252 | Stockwell | Apr. 20, 1869 |
| 581,171 | Nevin | Apr. 20, 1897 |
| 609,751 | Whippo | Aug. 23, 1898 |
| 773,896 | Richards | Nov. 1, 1904 |
| 824,966 | Werner | July 3, 1906 |
| 837,112 | Perkins | Nov. 27, 1906 |
| 1,440,993 | Hasbrouck | Jan. 2, 1923 |
| 1,515,129 | Mayer | Nov. 11, 1924 |
| 1,931,477 | Allen | Oct. 24, 1933 |

FOREIGN PATENTS

| Number | Country | Date |
| --- | --- | --- |
| 150,813 | Great Britain | Sept. 6, 1920 |